US008797895B2

(12) United States Patent
Baba et al.

(10) Patent No.: US 8,797,895 B2
(45) Date of Patent: Aug. 5, 2014

(54) RADIO RELAY STATION, RADIO RELAY METHOD, RADIO COMMUNICATION SYSTEM, LOCATION MANAGEMENT DEVICE, RADIO TERMINAL, AND RADIO COMMUNICATION METHOD

(75) Inventors: Takashi Baba, Yokohama (JP); Nobuo Kuchiki, Yokohama (JP); Akira Ishida, Yokohama (JP); Hiroshi Watanabe, Daito (JP); Eiji Nakayama, Daito (JP)

(73) Assignee: KYOCERA Corporation, Kyoto (JP)

( * ) Notice: Subject to any disclaimer, the term of this patent is extended or adjusted under 35 U.S.C. 154(b) by 437 days.

(21) Appl. No.: 13/061,117

(22) PCT Filed: Aug. 26, 2009

(86) PCT No.: PCT/JP2009/064855
§ 371 (c)(1),
(2), (4) Date: Apr. 15, 2011

(87) PCT Pub. No.: WO2010/024288
PCT Pub. Date: Mar. 4, 2010

(65) Prior Publication Data
US 2011/0188398 A1 Aug. 4, 2011

(30) Foreign Application Priority Data

Aug. 27, 2008 (JP) .................................. 2008-217661
Sep. 26, 2008 (JP) .................................. 2008-247122

(51) Int. Cl.
*H04L 12/26* (2006.01)
*H04W 40/16* (2009.01)

(52) U.S. Cl.
CPC .................................... *H04W 40/16* (2013.01)
USPC ......................................... 370/252; 375/224

(58) Field of Classification Search
CPC ..................................................... H04W 40/16
USPC ......... 370/252, 315, 332, 281; 455/11.1, 509, 455/436
See application file for complete search history.

(56) References Cited

U.S. PATENT DOCUMENTS

| 7,990,905 | B2 * | 8/2011 | Lappetelainen et al. ....... 370/315 |
| 2006/0166618 | A1 * | 7/2006 | Bakaimis ...................... 455/11.1 |
| 2008/0062908 | A1 * | 3/2008 | Hart et al. ..................... 370/315 |

(Continued)

FOREIGN PATENT DOCUMENTS

| JP | S63-299529 A | 12/1988 |
| JP | H06-188800 A | 7/1997 |

(Continued)

OTHER PUBLICATIONS

International Search Report and Written Opinion dated Dec. 1, 2009 issued by the Japanese Patent Office for International Application No. PCT/JP2009/064855.

(Continued)

*Primary Examiner* — Dang Ton
*Assistant Examiner* — Lionel Preval
(74) *Attorney, Agent, or Firm* — Procopio, Cory, Hargreaves & Savitch LLP

(57) ABSTRACT

Provided is a radio relay station which relays data transmitted and received by a radio base station a radio terminal in a radio communication system which employs the TDD scheme. The radio relay station receives data from the radio base station during a downlink subframe period and transmits data to the radio base station during an uplink subframe period. The radio relay station sets a remote side transmission period for transmitting data to the radio terminal in the uplink subframe period and sets a remote side reception period for receiving data from the radio terminal in the downlink subframe period.

5 Claims, 13 Drawing Sheets

(56) References Cited

U.S. PATENT DOCUMENTS

| | | |
|---|---|---|
| 2008/0247340 A1* | 10/2008 | Choi et al. ............... 370/281 |
| 2009/0059867 A1* | 3/2009 | Rajasimman et al. ....... 370/332 |
| 2010/0029282 A1* | 2/2010 | Stamoulis et al. .......... 455/436 |
| 2010/0075704 A1* | 3/2010 | McHenry et al. ........... 455/509 |
| 2010/0128654 A1* | 5/2010 | Zhou et al. ............... 370/315 |

FOREIGN PATENT DOCUMENTS

| | | | |
|---|---|---|---|
| JP | H10-066138 A | 3/1998 | |
| JP | 2001-024570 A | 1/2001 | |
| JP | 2002-252587 A | 9/2002 | |
| JP | 2004-297482 A | 10/2004 | |
| JP | 2008-067386 A | 3/2008 | |

OTHER PUBLICATIONS

Notification of Reasons for Refusal dated Sep. 8, 2009 issued by the Japanese Patent Office for the counterpart Application No. JP 2008-217661.

* cited by examiner

FIG. 3
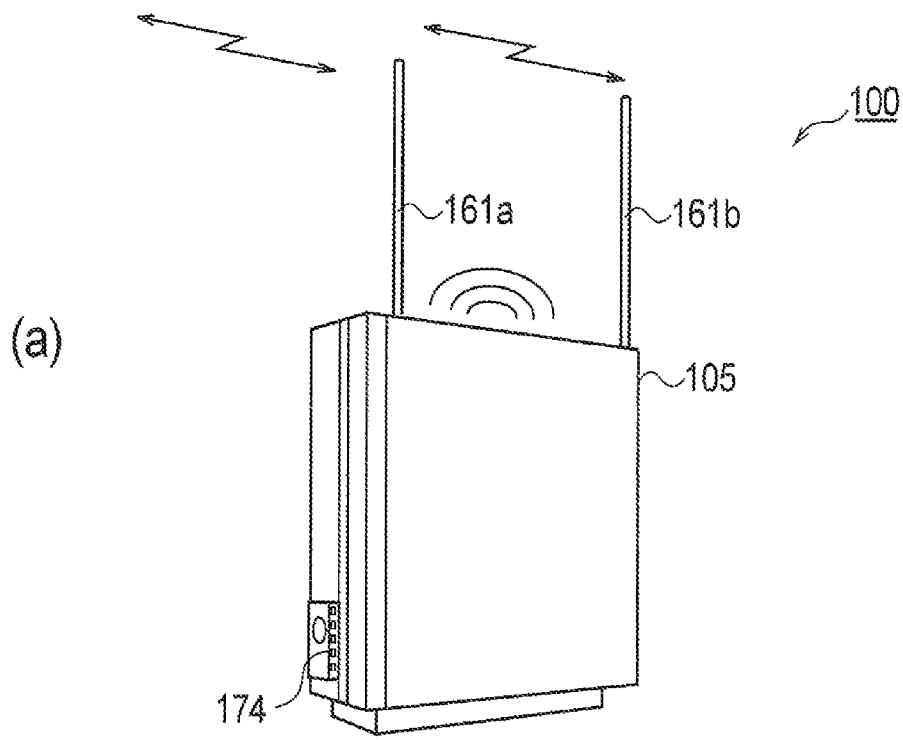
(a)
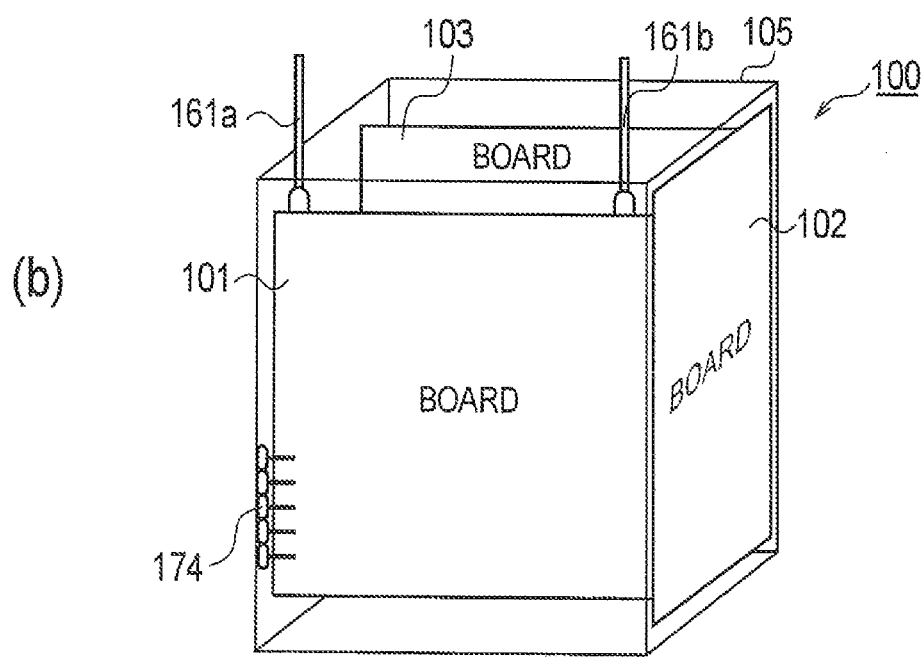
(b)

FIG. 14

STATION LOCATION INFORMATION

| RELAY STATION/ BASE STAION ID | LOCATION |
|---|---|
| BS | X1, Y1 |
| RS1 | X2, Y2 |
| RS2 | X3, Y3 |
| RS3 | X4, Y4 |

FIG. 15

RANKING NOTICE

| RANKING | RELAY STATION/ BASE STAION ID |
|---|---|
| 1 | RS2 |
| 2 | RS3 |
| 3 | BS |
| 4 | RS1 |

RADIO RELAY STATION, RADIO RELAY METHOD, RADIO COMMUNICATION SYSTEM, LOCATION MANAGEMENT DEVICE, RADIO TERMINAL, AND RADIO COMMUNICATION METHOD

TECHNICAL FIELD

The present invention relates to a technique for relaying data through radio communication, and particularly relates to a radio relay station, a radio relay method, a radio communication system, a location management device, a radio terminal, and a radio communication method.

BACKGROUND ART

First Background Art

A radio relay station has heretofore been widely used which relays data transmitted and received by a first radio communication device such as a radio base station and a second radio communication device such as a radio terminal (see Patent Document 1, for example). Such a radio relay station includes a first transceiver which transmits and receives data to and from the first radio communication device and a second transceiver which transmits and receives data to and from the second radio communication device.

Further, the time division duplex (TDD) scheme is known as a scheme for achieving bidirectional communication in a radio communication system. According to the TDD scheme, each of communication time frames (communication frames) segmented on the time axis is provided, in a time-sharing manner, with a first period (downlink frame, for example) during which data is transmitted from the first radio communication device to the second radio communication device and a second period (uplink frame, for example) during which data is transmitted from the second radio communication device to the first radio communication device.

In the case of using the radio relay station in a radio communication system employing the TDD scheme, in the first period, the first transceiver receives data from the first radio communication device and, at the same time, the second transceiver transmits data to the second radio communication device. Likewise, in the second period, the second transceiver receives data from the second radio communication device and, at the same time, the first transceiver transmits data to the first radio communication device.

For this reason, a radio wave transmitted from an antenna of the second transceiver is propagated to an antenna of the first transceiver in the first period, and a radio wave transmitted from the antenna of the first transceiver is propagated to the antenna of the second transceiver in the second period. Such propagation poses a problem that the first transceiver and the second transceiver are affected by their mutual interference.

Second Background Art

A radio terminal generally executes search processing to perform radio communication with a radio base station with the best condition. Specifically, the radio terminal measures the reception quality of a radio signal transmitted by each radio base station which can be a candidate for a radio communication counterpart of the radio terminal, on the basis of a neighbor list notified by a radio base station. Then, the radio terminal selects a radio base station with the best reception quality as the radio communication counterpart.

In recent years, a radio relay station which relays communication between a radio base station and a radio terminal has been widely used in a radio communication system. Such a radio relay station is installed in an edge region of the cell (i.e., a radio communication coverage area) of a radio base station, for example. Even when a radio terminal is located outside the cell of a radio base station, the radio terminal can communicate with the radio base station through a radio relay station as long as the radio terminal is located within the cell of the radio relay station (see Patent Document 1, for example).

In an area where cells of a radio base station and a radio relay station overlap each other, the radio base station and the radio relay station can be candidates for a radio communication counterpart of a radio terminal. In this case, the radio terminal executes search processing on each of the radio base station and the radio relay station to select any one of the radio base station and the radio relay station as its radio communication counterpart.

CITATION LIST

Patent Document

Patent Document 1: Japanese Patent Application Publication No. 2008-67386 ([Abstract] and so forth)

SUMMARY OF THE INVENTION

First Problem

With regard to the first background art, any of the following methods (a) to (c) is conceivable for avoiding influence of interference. (a) An interval between the antenna of the first transceiver and the antenna of the second transceiver is set large, or a radio wave shielding plate is arranged between the antennas. (b) An advanced signal processing technique for eliminating the influence of interference is introduced. (b) An interval between the communication frequency of the first transceiver and the communication frequency of the second transceiver is set large.

However, the above methods (a) and (b) have a problem of increase in the size and cost of the radio relay station. The above method (c) has a problem of difficulty in the change of the communication frequency since the communication frequency available for the radio relay station is set in advance.

To address these problems, the present invention provides a radio relay station and a radio relay method which prevent the first transceiver and the second transceiver from being affected by their mutual interference without changing a communication frequency, and which suppress increase in size and cost.

According to a first feature for solving the first problem, there is provided a radio relay station (radio relay station 100) configured to relay data transmitted and received by a first radio communication device (e.g. radio base station 200) and a second radio communication device (e.g. radio terminal 300) in a radio communication system (radio communication system 1) where each of communication time frames (communication frame period Tn) segmented on a time axis is provided, in a time-sharing manner, with a first period (e.g. downlink subframe period t1) during which data is transmitted from the first radio communication device to the second radio communication device and a second period (e.g. uplink subframe period t2) during which data is transmitted from the second radio communication device to the first radio communication device, the radio relay station comprising: a first transceiver (donor-side transceiver 120D) configured to receive data from the first radio communication device in the first period and to transmit data to the first radio communication device in the second period; a second transceiver (remote-side transceiver 120R) configured to transmit data to the second radio communication device and to receive data from the second radio communication device; and a controller (controller 130R) configured to control the second transceiver, wherein the controller sets a transmission period (remote-side transmission period P1), during which the second transceiver transmits data to the second radio communication device, in the second period.

According to such a radio relay station, the controller sets the transmission period during which the second transceiver transmits data to the second radio communication device, as the second period. This allows preventing a radio wave emitted from the second transceiver from interfering with the first transceiver in the first period. Moreover, what is required is only to change the transmission period, and thus the change of the communication frequency is not required. Further, increase in the size and cost of the radio relay station can be suppressed as compared to the above methods (a) and (b).

In the first feature for solving the first problem, the controller sets a reception period, during which the second transceiver receives data from the second radio communication device, in the first period.

In the first feature for solving the first problem, a time length of the first period is longer than a time length of the second period, the transmission period partly extends beyond the second period to overlap a part (overlap portion Δt) of the first period on the time axis, by setting the transmission period in the second period by the controller, and the controller stops transmission of data from the second transceiver to the second radio communication device in the part (overlap portion Δt) of the transmission period overlapping the first period.

According to a second feature for solving the first problem, there is provided a radio relay station (radio relay station 100) configured to relay data transmitted and received by a first radio communication device (e.g. radio base station 200) and a second radio communication device (e.g. radio terminal 300) in a radio communication system (radio communication system 1) where each of communication time frames (communication frame period Tn) segmented on a time axis is provided, in a time-sharing manner, with a first period (e.g. downlink subframe period t1) during which data is transmitted from the first radio communication device to the second radio communication device and a second period (e.g. uplink subframe period t2) during which data is transmitted from the second radio communication device to the first radio communication device, the radio relay station comprising: a first transceiver (donor-side transceiver 120D) configured to receive data from the first radio communication device in the first period and to transmit data to the first radio communication device in the second period; a second transceiver (remote-side transceiver 120R) configured to transmit data to the second radio communication device and to receive data from the second radio communication device; and a controller (controller 130R) configured to control the second transceiver, wherein the controller sets a reception period (remote-side reception period P2), during which the second transceiver receives data from the second radio communication device, in the first period.

According to such a radio relay station, the controller sets the reception period during which the second transceiver receives data from the second radio communication device, as the first period. This allows preventing a radio wave emitted from the first transceiver from interfering with the second transceiver in the second period. Moreover, what is required is only to change the reception period, and thus the change of the communication frequency is not required. Further, increase in the size and cost of the radio relay station can be suppressed as compared to the above methods (a) and (b).

In the first or second feature for solving the first problem, a frequency band (e.g. 30 MHz) available for radio communication by the first transceiver and the second transceiver is divided into at least three communication frequencies, the three communication frequencies include a first communication frequency (communication frequency F1), a second communication frequency (communication frequency F2), and a third communication frequency (communication frequency F3) between the first communication frequency and the second communication frequency, the first transceiver performs radio communication with the first radio communication device by not using the third communication frequency but using the first communication frequency, and the second transceiver performs radio communication with the second radio communication device by not using the third communication frequency but using the second communication frequency.

According to a second feature for solving the first problem, the first radio communication device is a radio base station (radio base station 200), and the second radio communication device is a radio terminal (radio terminal 300).

According to a third feature for solving the first problem, there is provided a radio relay method used for a radio relay station configured to relay data transmitted and received by a first radio communication device and a second radio communication device in a radio communication system where each of communication time frames segmented on a time axis is provided, in a time-sharing manner, with a first period during which data is transmitted from the first radio communication device to the second radio communication device and a second period during which data is transmitted from the second radio communication device to the first radio communication device, the radio relay method comprising the steps of: causing a first transceiver to receive data from the first radio communication device in the first period and to transmit data to the first radio communication device in the second period; and controlling a second transceiver configured to transmit data to the second radio communication device and to receive data from the second radio communication device, wherein the controlling step comprises a step of setting a transmission period, during which the second transceiver transmits data to the second radio communication device, in the second period.

According to a fourth feature for solving the first problem, there is provided a radio relay method used for a radio relay station configured to relay data transmitted and received by a first radio communication device and a second radio communication device in a radio communication system where each of communication time frames segmented on a time axis is provided, in a time-sharing manner, with a first period during which data is transmitted from the first radio communication device to the second radio communication device and a second period during which data is transmitted from the second radio communication device to the first radio communication device, the radio relay method comprising the steps of: causing a first transceiver to receive data from the first radio communication device in the first period and to transmit data to the first radio communication device in the second period; and controlling a second transceiver configured to transmit data to the second radio communication device and to receive data from the second radio communication device, wherein the controlling step comprises a step of setting a reception period, during which the second transceiver receives data from the second radio communication device, in the first period.

Second Problem

With regard to the second background art, in a case where the radio terminal executes search processing on each of the radio base station and the radio relay station, the processing load and power consumption of the radio terminal are increased as compared to the case where the radio terminal executes search processing only on the radio base station.

Further, in a radio communication system in which multiple radio relay stations are installed in the cell of one radio base station, the multiple radio relay stations can be candidates for a radio communication counterpart of the radio terminal. In a case where the radio terminal executes search processing on the multiple radio relay stations, there is a problem of further increase in the processing load and power consumption of the radio terminal.

Further, some radio relay stations are movable. Accordingly, it is difficult for the radio terminal to select its appropriate radio communication counterpart in a case where radio relay stations can be candidates for the radio communication counterpart of the radio terminal.

To address these problems, the present invention provides a radio communication system, a location management device, a radio terminal, and a radio communication method which allow the radio terminal to select its appropriate radio communication counterpart while reducing the processing load and power consumption of the radio terminal that are associated with search processing, in the case where a radio base station and a radio relay station can be candidates for the radio communication counterpart of the radio terminal.

According to a first feature for solving the second problem, there is provided a radio communication system (radio communication system 10) in which a radio terminal (radio terminal 400) executes search processing of measuring reception quality of a radio signal transmitted by each of a radio base station (radio base station BS) and a radio relay station (radio relay station RS) which are potential candidates for a radio communication counterpart of the radio terminal, and of selecting the radio communication counterpart in accordance with the reception quality, the radio communication system comprising: a location management device (location management device 500) configured to manage station location information indicating locations of the radio base station and the radio relay station, wherein the location management device comprises: an acquisition unit (terminal location acquisition unit 522) configured to acquire terminal location information indicating a location of the radio terminal; a ranking unit (ranking unit 523) configured to rank the radio base station and the radio relay station in an ascending order or descending order of a distance to the radio terminal, on the basis of the station location information and the terminal location information acquired by the acquisition unit; and a notice transmitter (notification unit 524 and wired communication unit 510) configured to send the radio terminal a ranking notice based on a result of the ranking by the ranking unit, and the radio terminal executes the search processing only on a top predetermined number of the radio base station and the radio relay station in the ascending order of the distance to the radio terminal, on the basis of the ranking notice received from the location management device.

According to such a radio communication system, the location management device sends the radio terminal the ranking notice based on the result of ranking the radio base station and the radio relay station in the ascending order or descending order of the distance to the radio terminal. On the basis of the ranking notice received from the location management device, the radio terminal executes the search processing only on the top predetermined number of the radio base station and the radio relay station, which are potential candidates for the radio communication counterpart, in the ascending order of the distance to the radio terminal.

In other words, the radio terminal executes the search processing not on all of the radio base station and the radio relay station which are potential candidates for the radio communication counterpart, but only on a part thereof. This allows reduction in the processing load and power consumption of the radio terminal that are associated with the search processing.

Further, the radio base station or the radio relay station having a small distance to the radio terminal is considered as an appropriate radio communication counterpart of the radio terminal since it has a small propagation loss in radio communication with the radio terminal. Accordingly, the radio terminal can select its appropriate radio communication counterpart by executing the search processing only on the top predetermined number of the radio base station and the radio relay station in the ascending order of the distance to the terminal itself.

Thus, the radio communication system according to the above aspects allows the radio terminal to select its appropriate radio communication counterpart while reducing the processing load and power consumption of the radio terminal that are associated with the search processing, in the case where the radio base station and the radio relay station can be candidates for the radio communication counterpart of the radio terminal.

In the first feature for solving the second problem, the radio relay station is movable and sends the location management device a location notice for notification of the location of the radio relay station, and the location management device further comprises: a storage (storage 530) configured to store the station location information; and an information update unit (information update unit 521) configured to update the station location information stored in the storage, in accordance with the location notice received from the radio relay station.

In the first feature, the radio terminal comprises: a terminal location detector (location detector 432) configured to detect the location of the radio terminal; and a terminal location information transmitter (transmitter 411) configured to send the location management device the terminal location information indicating the location detected by the terminal location detector.

In the first feature for solving the second problem, the radio terminal further comprises a handover execution unit (handover execution unit 434) configured to execute handover to the radio communication counterpart selected through the search processing.

According to a second feature for solving the second problem, there is provided a location management device (location management device 500) configured to manage station location information indicating locations of a radio base station (radio base station BS) and a radio relay station (radio relay station RS) which are potential candidates for a radio communication counterpart of a radio terminal (radio terminal 400), the location management device comprising: an acquisition unit (terminal location acquisition unit 522) configured to acquire terminal location information indicating a location of the radio terminal; a ranking unit (ranking unit 523) configured to rank the radio base station and the radio relay station in an ascending order or descending order of a distance to the radio terminal, on the basis of the station location information and the terminal location information acquired by the acquisition unit; and a notice transmitter (notification unit 524 and wired communication unit 510) configured to send the radio terminal a ranking notice based on a result of the ranking by the ranking unit.

According to a third feature for solving the second problem, there is provided a radio terminal (radio terminal 400) configured to execute search processing of measuring reception quality of a radio signal transmitted by each of a radio base station (radio base station BS) and a radio relay station (radio relay station RS) which are potential candidates for a radio communication counterpart of the radio terminal, and of selecting the radio communication counterpart in accordance with the reception quality, the radio terminal comprising: a notice receiver (receiver 412) configured to receive a ranking notice from a location management device (location management device 500) configured to manage station location information indicating locations of the radio base station and the radio relay station, the ranking notice being based on a result of ranking the radio base station and the radio relay station in an ascending order or descending order of a distance to the radio terminal; and a search processing unit (search processing unit 433) configured to execute the search processing only on a top predetermined number of the radio base station and the radio relay station in the ascending order of the distance to the radio terminal, on the basis of the ranking notice received by the notice receiver.

According to a fourth feature for solving the second problem, there is provided a radio communication method using: a radio terminal (radio terminal 400) configured to execute search processing of measuring reception quality of a radio signal transmitted by each of a radio base station (radio base station BS) and a radio relay station (radio relay station RS) which are potential candidates for a radio communication counterpart of the terminal itself, and of selecting the radio communication counterpart in accordance with the reception quality; and a location management device (location management device 500) configured to manage station location information indicating locations of the radio base station and the radio relay station, the radio communication method comprising the steps of: acquiring (step S203), at the location management device, terminal location information indicating a location of the radio terminal; ranking (steps S204, S205), at the location management device, the radio base station and the radio relay station in an ascending order or descending order of a distance to the radio terminal, on the basis of the station location information and the terminal location information acquired in the acquisition step; sending (step S206), from the location management device to the radio terminal, a ranking notice based on a result of the ranking made in the ranking step; and executing (step S207), at the radio terminal, search processing only on a top predetermined number of the radio base station and the radio relay station in the ascending order of the distance to the radio terminal, on the basis of the ranking notice received by the location management device.

BRIEF DESCRIPTION OF DRAWINGS

FIG. 3 is a schematic perspective view showing an implementation example of the radio relay station according to the first embodiment of the present invention.

FIG. 14 is a diagram showing a configuration example of station location information according to the second embodiment of the present invention.

FIG. 15 is a diagram showing a configuration example of a ranking notice according to the second embodiment of the present invention.

DESCRIPTION OF EMBODIMENTS

Figure 1:
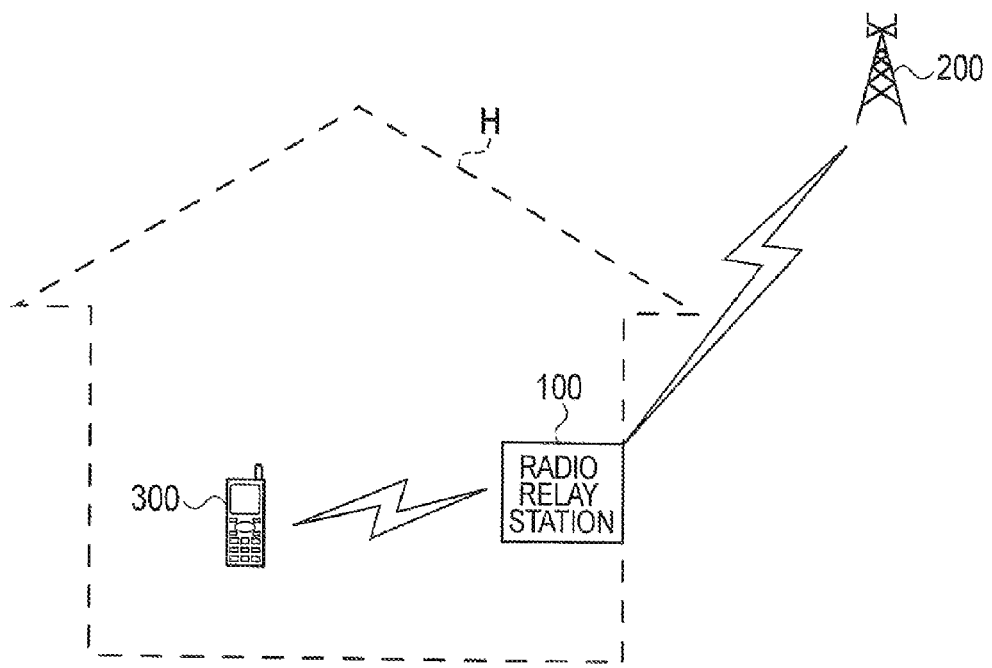
FIG. 1 is a view showing a schematic configuration of a radio communication system according to a first embodiment of the present invention.

Next, a radio communication system according to embodiments of the present invention is described with reference to the drawings. In the following description of the drawings in the embodiments, the same or similar reference numerals are given to the same or similar components.

First Embodiment

First of all, a radio communication system according to a first embodiment of the present invention is described. Specifically, description is given of (1) Schematic Configuration of Radio Communication System, (2) Configuration of Radio Relay Station, (3) Operation of Radio Relay Station, (4) Advantageous Effects, and (5) Modified Example.

(1) Schematic Configuration of Radio Communication System

FIG. 1 is a view showing a schematic configuration of a radio communication system 1 according to the first embodiment.

As shown in FIG. 1, the radio communication system 1 includes a radio relay station 100, a radio base station 200, and a radio terminal 300. The radiocommunication system 1 has a configuration based on WiMAX (IEEE802.16). In other words, the radio communication system 1 employs the orthogonal frequency-division multiple access (OFDMA) scheme and the time division duplex (TDD) scheme.

The OFDMA scheme realizes multiple accesses by using multiple subcarriers orthogonal to each other. The TDD scheme realizes bidirectional communication by performing uplink communication and downlink communication in a time-division manner in one communication frame (communication time frame). Here, "uplink" indicates a direction from the radio terminal 300 toward the radio base station 200, and "downlink" indicates a direction from the radio base station 200 toward the radio terminal 300.

According to WiMAX, downlink communication is firstly performed and uplink communication is performed thereafter in a communication frame. Hereinafter, a period during which downlink communication is performed in a communication frame is referred to as a "downlink subframe period (first period)," and a period during which uplink communication is performed in the communication frame is referred to as an "uplink subframe period (second period)." Since downlink communication requires a larger communication capacity than uplink communication does, the time length of the downlink subframe period is longer than the time length of the uplink subframe period (see FIG. 5).

The radio relay station 100 relays data transmitted and received by the radio base station 200 and the radio terminal 300. This allows the radio terminal 300 to communicate with the radio base station 200 even if the radio terminal 300 is located outside a cell (communication area) formed by the radio base station 200, or located in an edge portion of the cell (so-called a cell fringe). In the example of FIG. 1, the radio relay station 100 is installed in home H, and performs radio communication with the radio terminal 300 located in the home H. Such a radio relay station 100 is required to be small in size and low in price.

(2) Configuration of Radio Relay Station

Next, a configuration of the radio relay station 100 is described in the order of (2.1) Configuration of Functional Blocks and (2.2) Implementation Example.

(2.1) Configuration of Functional Blocks

Figure 2:
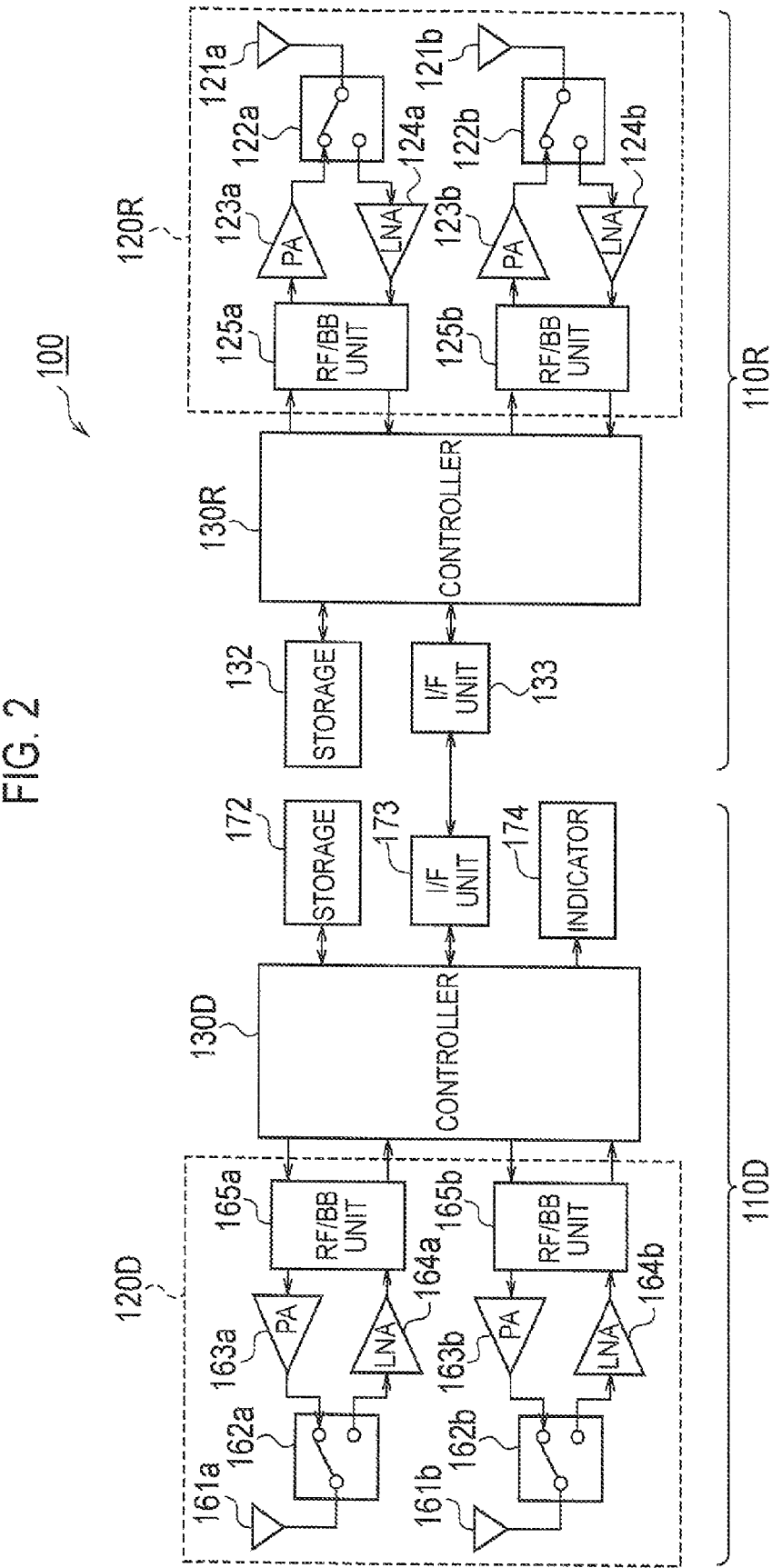
FIG. 2 is a diagram showing a configuration of functional blocks of a radio relay station according to the first embodiment of the present invention.

FIG. 2 is a block diagram showing a configuration of functional blocks of the radio relay station 100.

As shown in FIG. 2, the radio relay station 100 includes a donor-side communication unit 110D communicating with the radio base station 200 and a remote-side communication unit 110R communicating with the radio terminal 300. The donor-side communication unit 110D has a communication function equivalent to that of the radio terminal, whereas the remote-side communication unit 110R has a communication function equivalent to that of the radio base station. The donor-side communication unit 110D and the remote-side communication unit 110R are wired through Ethernet (registered trademark) or the like.

The donor-side communication unit 110D includes a donor-side transceiver 120D (first transceiver), a controller 130D, a storage 172, an interface (I/F) unit 173, and an indicator 174. The donor-side transceiver 120D transmits and receives data to and from the radio base station 200 with the OFDMA/TDD schemes. Specifically, the donor-side transceiver 120D includes donor antennas 161a and 161b, transmission/reception changeover switches 162a and 162b, power amplifiers (PAs) 163a and 163b, low-noise amplifiers (LNAs) 164a and 164b, and radio frequency/baseband (RF/BB) units 165a and 165b. In this way, the first embodiment achieves a diversity effect by providing two transmission/reception systems in the donor-side transceiver 120D. The controller 130D is formed of a CPU, for example, and controls various functions included in the donor-side communication unit 110D. The storage 172 is formed of a memory, for example, and stores therein various information used for control and the like in the donor-side communication unit 110D. The I/F unit 173 is connected to the remote-side communication unit 110R. The indicator 174 is controlled by the controller 130D and displays information indicating the reception level from the radio base station 200.

The remote-side communication unit 110R includes a remote-side transceiver 120R (second transceiver), a controller 130R (controller), a storage 132, and an I/F unit 133. The remote-side transceiver 120R transmits and receives data to and from the radio terminal 300 with the OFDMA/TDD schemes. Specifically, the remote-side transceiver 120R includes remote antennas 121a and 121b, transmission/reception changeover switches 122a and 122b, PAs 123a and 123b, LNAs 124a and 124b, and RF/BB units 125a and 125b. In this way, the first embodiment achieves a diversity effect by providing two transmission/reception systems in the remote-side transceiver 120R. The controller 130R is formed of a CPU, for example, and controls various functions included in the remote-side communication unit 110R. The storage 132 is formed of a memory, for example, and stores therein various information used for control and the like in the remote-side communication unit 110R. The I/F unit 133 is connected to the donor-side communication unit 110D.

(2.2) Implementation Example

FIG. 3 is a schematic perspective view showing an implementation example of the radio relay station 100.

As shown in FIG. 3(a) and FIG. 3(b), arranged in a case 105 of the radio relay station 100 are: a board 101 in which the donor-side communication unit 110D is implemented; a board 103 in which the remote-side communication unit 110R is implemented; and a board 102 in which a mechanism for relay between the donor-side communication unit 110D and the remote-side communication unit 110R is implemented. The donor antennas 161a and 161b extend from the board 101 to the outside of the case 105. The remote antennas 121a and 121b are arranged on the board 103. In this way, in the radio relay station 100, the donor antennas 161a and 161b and the remote antennas 121a and 121b are arranged to be adjacent to each other with no radio wave shielding plate provided therebetween.

(3) Operation of Radio Relay Station

Next, an operation of the radio relay station 100 is described in the order of (3.1) Schematic Operation and (3.2) Detailed Operation.

(3.1) Schematic Operation

Figure 4:
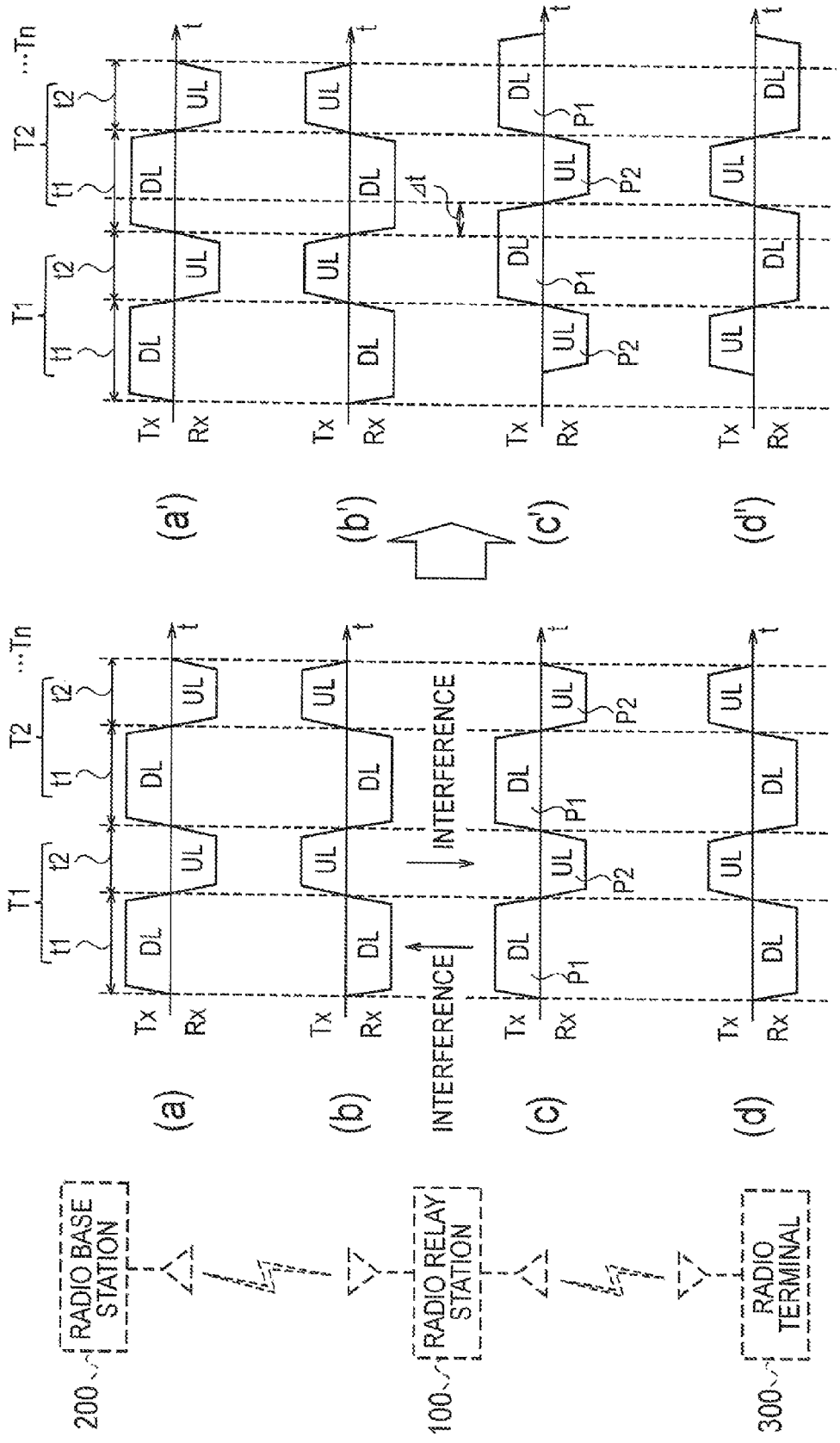
FIG. 4 is a time chart for illustrating a schematic operation of the radio relay station according to the first embodiment of the present invention.

FIG. 4 is a time chart for illustrating a schematic operation of the radio relay station 100.

FIG. 4(a) to FIG. 4(d) show how the radio base station 200, the radio relay station 100, and the radio terminal 300 communicate with each other in accordance with the conventional scheme. FIG. 4(a') to FIG. 4(d') show how the radio base station 200, the radio relay station 100, and the radio terminal 300 communicate with each other in accordance with the scheme of the first embodiment.

Note that, FIG. 4(a) and FIG. 4(a') show the operation of the radio base station 200, FIG. 4(b) and FIG. 4(b') show the operation of the donor-side transceiver 120D of the radio relay station 100, FIG. 4(c) and FIG. 4(c') show the operation of the remote-side transceiver 120R of the radio relay station 100, and FIG. 4(d) and FIG. 4(d') show the operation of the radio terminal 300.

As shown in FIG. 4(a) to FIG. 4(d), a downlink subframe period t1 and an uplink subframe period t2 are provided in a time-division manner in each communication frame period Tn. As shown in FIG. 4(b), the donor-side transceiver 120D of the radio relay station 100 receives data from the radio base station 200 in the downlink subframe period t1, and transmits data to the radio base station 200 in the uplink subframe period t2. According to the conventional scheme, as shown in FIG. 4(c), the remote-side transceiver 120R of the radio relay station 100 transmits data to the radio terminal 300 in the downlink subframe period t1, and receives data from the radio terminal 300 in the uplink subframe period t2. For this reason, the remote-side transceiver 120R interferes with the donor-side transceiver 120D in the downlink subframe period t1, and the donor-side transceiver 120D interferes with the remote-side transceiver 120R in the uplink subframe period t2.

According to the first embodiment, on the other hand, as shown in FIG. 4(c'), the controller 130R of the remote-side communication unit 110R sets a remote-side transmission period P1, during which the remote-side transceiver 120R transmits data to the radio terminal 300, in the uplink subframe period t2. Moreover, the controller 130R sets a remote-side reception period P2, during which the remote-side transceiver 120R receives data from the radio terminal 300, in the downlink subframe period t1.

For example, as shown in FIG. 4(a') to FIG. 4(d'), the radio relay station 100 transmits data received from the radio terminal 300 in the downlink subframe period t1 of the communication frame period T1, to the radio base station 200 in the uplink subframe period t2 of the communication frame period T1. Further, the radio relay station 100 transmits data received from the radio base station 200 in the downlink subframe period t1 of the communication frame period T1, to the radio terminal 300 in the uplink subframe period t2 of the communication frame period T1. Thus, the interference described above is avoided.

Note that, however, the time length of the downlink subframe period t1 is longer than the time length of the uplink subframe period t2. For this reason, since the controller 130R sets the remote-side transmission period P1 in the uplink subframe period t2, the remote-side transmission period P1 partly extends beyond the uplink subframe period t2 to overlap a part of the downlink subframe period t1. Hereinafter, the part of the remote-side transmission period P1 that overlaps the downlink subframe period t1 is called an overlap portion Δt. In the overlap portion Δt, the remote-side transceiver 120R interferes with the donor-side transceiver 120D. Hence, the controller 130R stops transmission of data from the remote-side transceiver 120R to the radio terminal 300 in the overlap portion Δt. Thus, the interference in the overlap portion Δt can also be avoided.

(3.2) Detailed Operation

Figure 5:
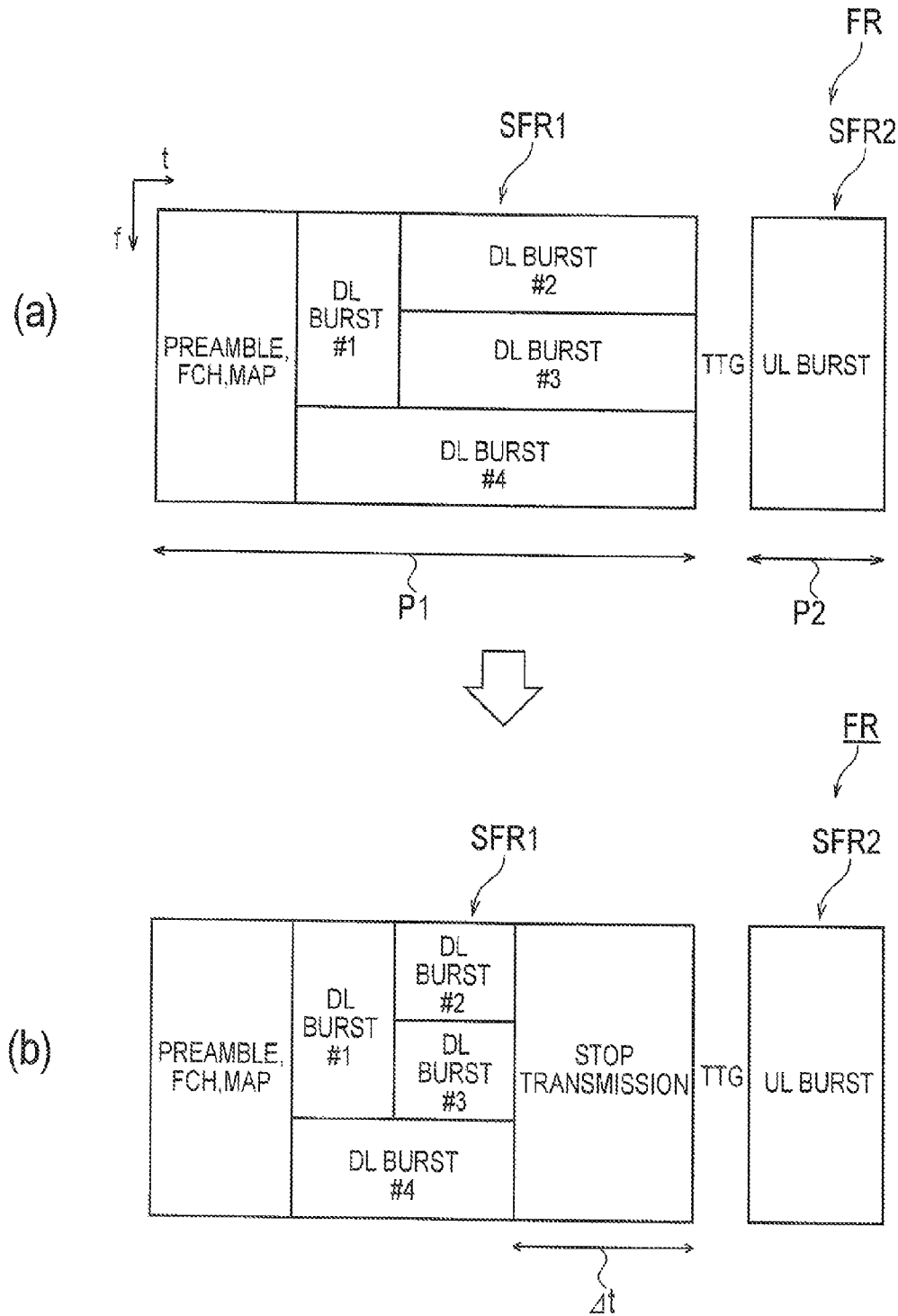
FIG. 5 is a diagram of a communication frame structure for illustrating a detailed operation of the radio relay station according to the first embodiment of the present invention.

Next, a detailed operation of the radio relay station 100 is described. FIG. 5 is a diagram of a communication frame structure for illustrating a detailed operation of the radio relay station 100.

As shown in FIG. 5(a), a communication frame FR in the WiMAX system includes a downlink subframe SFR1 and an uplink subframe SFR2. The downlink subframe SFR1 and the uplink subframe SFR2 are each formed of multiple symbols. The head of the downlink subframe SFR1 is a control data region including various control data, and a burst region including communication data (user data) follows the control data region. The control data includes a preamble which is a known symbol, a FCH (header information transmitted from the radio base station), and a MAP which is allocation information related to uplink and downlink burst signals. The remote-side transceiver 120R of the radio relay station 100 transmits the downlink subframe SFR1 in the remote-side transmission period P1, and receives the uplink subframe SFR2 in the remote-side reception period P2. Note that, a guard time (TTG) is provided between the downlink subframe SFR1 and the uplink subframe SFR2.

As shown in FIG. 5(b), the remote-side transceiver 120R of the radio relay station 100 stops transmission of the downlink subframe SFR1 in the overlap portion Δt (see FIG. 4) in the remote-side transmission period P1. For this reason, data that should be transmitted is not transmitted in the overlap portion Δt. However, such data can be transmitted to the radio terminal 300 by using a mechanism such as retransmission control. In the overlap portion Δt, it is preferable to place data whose communication delay is allowable, and not to place data, such as audio data, for which high real-time performance and quality of service (QoS) are required.

(4) Advantageous Effects

As has been described above, the controller 130R sets the remote-side transmission period P1 in the uplink subframe period t2 instead of in the downlink subframe period t1. This allows preventing a radio wave emitted from the remote-side transceiver 120R in the downlink subframe period t1 from interfering with the donor-side transceiver 120D. Moreover, the controller 130R sets the remote-side reception period P2 in the downlink subframe period t1 instead of in the uplink subframe period t2. This allows preventing a radio wave emitted from the donor-side transceiver 120D in the uplink subframe period t2 from interfering with the remote-side transceiver 120R. Further, what is required is only to change the remote-side transmission period P1 and the remote-side reception period P2, and thus the change of the communication frequency is not required. Furthermore, increase in the size and cost of the radio relay station 100 can be suppressed. Thus, according to the first embodiment, the radio relay station 100 which is small in size and low in price can be provided.

In the first embodiment, the controller 130R stops transmission of data from the remote-side transceiver 120R to the radio terminal 300 in the overlap portion Δt. This allows reliably avoiding the influence of interference even in the radio communication system 1 employing the uplink/downlink asymmetric frame configuration.

(5) Modified Example (5.1) First Modified Example

The radio relay station 100 is often installed in the cell fringe of the radio base station 200. Hence, a radio wave from the radio base station 200 sometimes fails to reach the radio relay station 100 normally depending on an installation location of the radio relay station 100. In this case, the radio relay station 100 cannot relay data.

Figure 6:
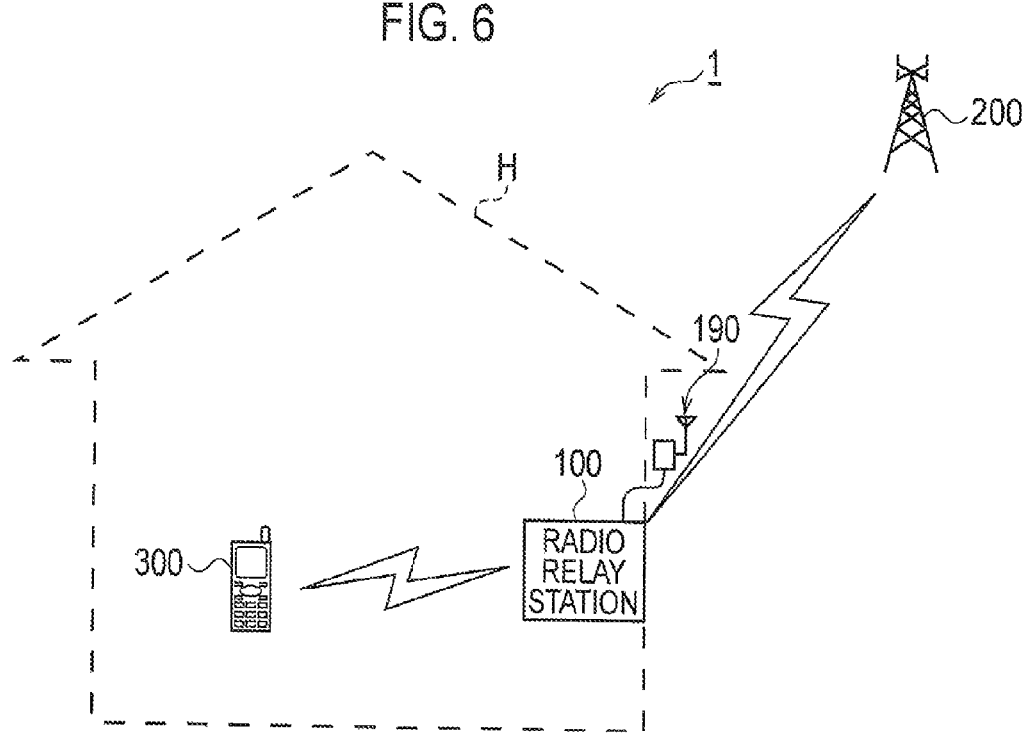
FIG. 6 is a view for illustrating a first modified example of the first embodiment of the present invention.

To address this problem, the radio relay station 100 in a first modified example can be connected to an external antenna unit 190, as shown in FIG. 6. Thereby, the radio relay station 100 can relay data even if a radio wave from the radio base station 200 fails to reach the radio relay station 100 normally.

The radio relay station 100 according to the first modified example has a connecting terminal to and from which a cable from the external antenna unit 190 is attached and detached.

The controller 130D automatically switches the transmission/reception system from the donor-side transceiver 120D to the external antenna unit 190 when detecting that the cable has been connected to the connecting terminal.

(5.2) Second Modified Example

Figure 7:
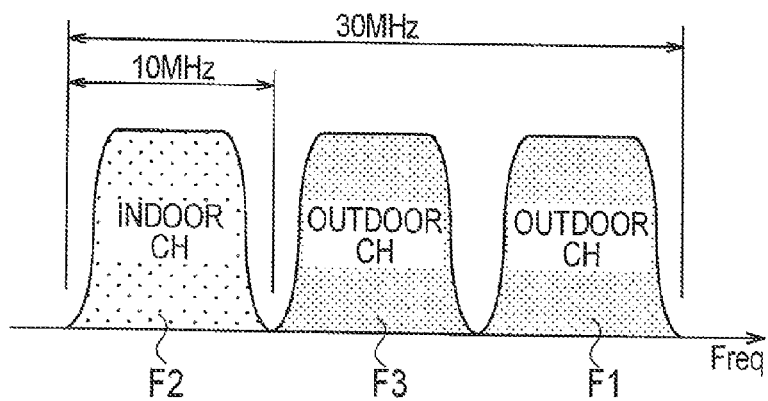
FIG. 7 is a view for illustrating a second modified example of the first embodiment of the present invention.

As has been described above, a frequency band available for use by the donor-side transceiver 120D and the remote-side transceiver 120R in radio communication in the radio communication system 1 is set in advance. As shown in FIG. 7, for example, a frequency band of 30 MHz is available, and is equally divided into three communication frequencies F1 to F3.

In a second modified example, the donor-side transceiver 120D performs radio communication with the radio base station 200 by not using the central communication frequency F3 but using the communication frequency F1; the remote-side transceiver 120R performs radio communication with the radio terminal 300 by not using the central communication frequency F3 but using the communication frequency F2. This secures an interval between the communication frequencies respectively used by the remote-side transceiver 120R and the donor-side transceiver 120D, thereby further reducing the influence of interference.

Second Embodiment

Next, a radio communication system according to a second embodiment of the present invention is described with reference to the drawings. Specifically, description is given of (1) Schematic Configuration of Radio Communication System, (2) Detailed Configuration of Radio Communication System, (3) Operation of Radio Communication System, and (4) Advantageous Effects.

(1) Schematic Configuration of Radio Communication System

Figure 8:
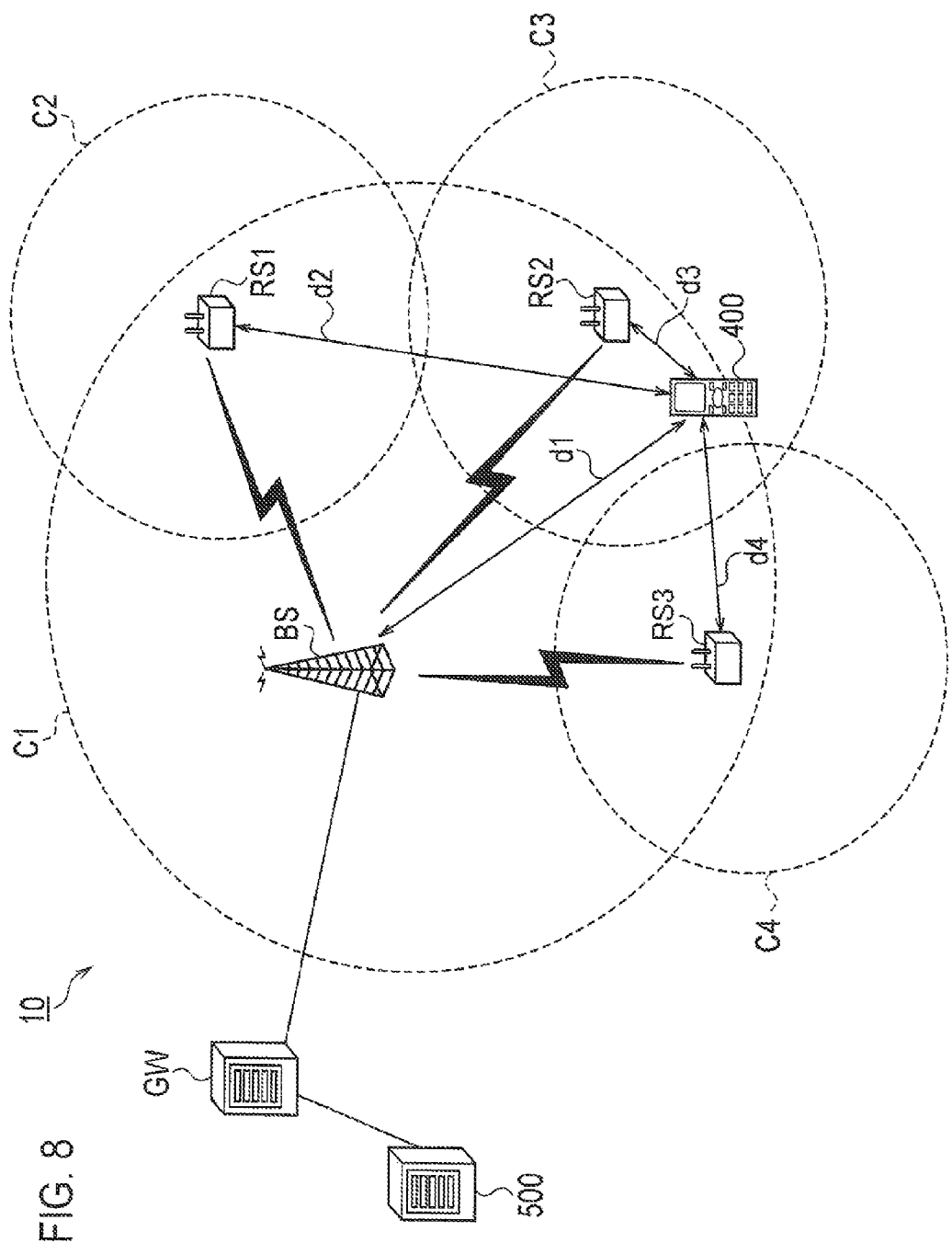
FIG. 8 is a view showing a schematic configuration of a radio communication system according to a second embodiment of the present invention.

FIG. 8 is a view showing a schematic configuration of a radio communication system 10 according to the second embodiment. As shown in FIG. 8, the radio communication system 10 includes a radio terminal 400, a radio base station BS, radio relay stations RS1 to RS3, a gateway device GW and a location management device 500. In the second embodiment, the radio communication system 10 has a configuration based on Mobile WiMAX (IEEE802.16e).

The radio base station BS forms a cell C1 that is an area in which the radio base station BS can perform radio communication with the radio terminal 400. The radio terminal 400 is located in en edge portion of the cell C1 (i.e., cell fringe). The radio base station BS transmits (broadcasts) a neighbor list in the cell C1, the neighbor list being used for notification of a radio base station and a radio relay station which can be candidates for a radio communication counterpart of the radio terminal 400.

For example, the neighbor list includes an identification information for identifying an adjacent base station which is a radio base station adjacent to the radio base station BS, and an identification information for identifying a radio relay station located in the cell C1. Such identification information is formed by associating an identifier (ID) of the adjacent base station or the radio relay station with information on a channel (such as a frequency) used for communication by the corresponding one of the adjacent base station and the radio relay station.

The radio terminal 400 executes search processing on the basis of the neighbor list transmitted by the radio base station BS, in order to search for a radio communication counterpart with the best condition. Such search processing is also called frequency search, cell search, or cell scan.

The radio terminal 400 measures the reception quality of each radio signal (more specifically a known signal such as a preamble) transmitted by the radio base station and the radio relay station identified through the neighbor list, and thus selects a radio communication counterpart with the best reception quality. The reception quality indicates the reception electric field strength (RSSI), the received signal-to-noise ratio (received SNR), or the like, for example. Upon selection of the radio communication counterpart, the radio terminal 400 establishes synchronization with the selected radio communication counterpart.

The radio relay stations RS1 to RS3 are located in the cell C1. For example, each of the radio relay stations RS1 to RS3 is a small-sized radio relay station which can be installed indoors, for example. Since the radio relay stations RS1 to RS3 have the same configuration, the radio relay stations RS1 to RS3 are hereinafter collectively called a "radio relay station RS" as appropriate.

The radio relay station RS relays communication between the radio base station BS and the radio terminal 400. In the example of FIG. 8, each of the radio relay stations RS1 to RS3 is installed in the cell fringe of the cell C1 of the radio base station BS.

The radio relay station RS1 forms a cell C2. The radio relay station RS2 forms a cell C3. The radio relay station RS3 forms a cell C4. Even if the radio terminal 400 is located outside the cell C1, the radio terminal 400 can communicate with the radio base station BS through the radio relay station RS as long as the radio terminal 400 is located within any one of the cells C2 to C4.

The gateway device GW is an ASN-GW (Access Service Network Gateway) compliant with WiMAX. Here, ASN means a network providing a radio access function. In other words, the gateway device GW constitutes a part of ASN, and serves as an interface between a network and the radio base station BS.

The location management device 500 is connected to the gateway device GW. The location management device 500 manages station location information indicating locations of the radio base station BS and the radio relay station RS. In the second embodiment, the location management device 500 is configured as a server managing the station location information.

(2) Detailed Configuration of Radio Communication System

Next, a detailed configuration of the radio communication system 10 is described with reference to FIG. 9 to FIG. 11. Specifically, description is given of (2.1) Configuration of Radio Terminal, (2.2) Configuration of Location Management Device, and (2.3) Configuration of Radio Relay Station.

(2.1) Configuration of Radio Terminal

Figure 9:
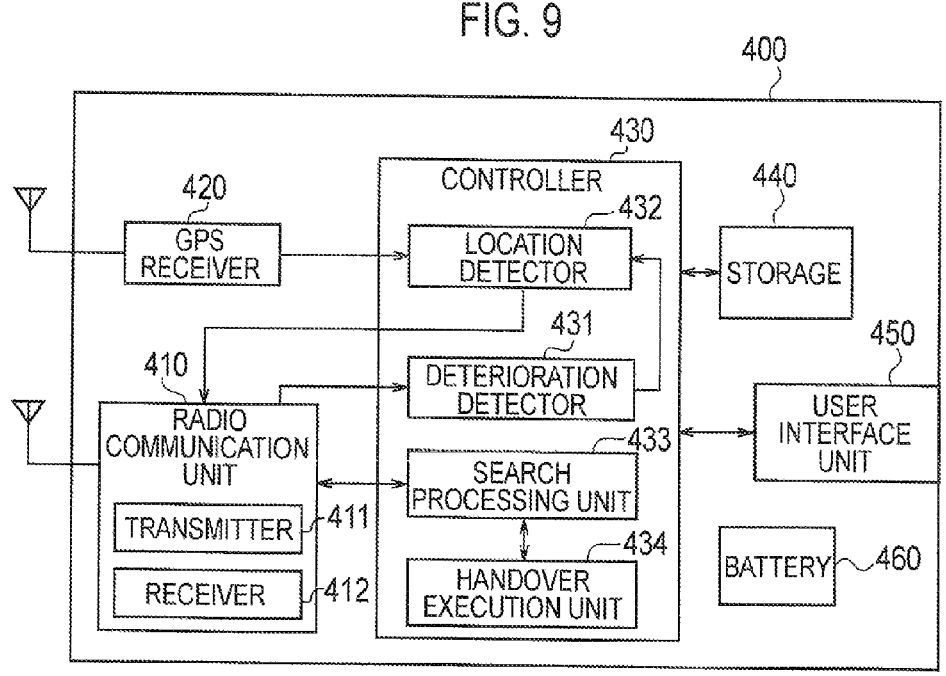
FIG. 9 is a functional block diagram showing a configuration of a radio terminal according to the second embodiment of the present invention.

FIG. 9 is a functional block diagram showing a configuration of the radio terminal 400. As shown in FIG. 9, the radio terminal 400 includes a radio communication unit 410, a GPS receiver 420, a controller 430, a storage 440, a user interface unit 450, and a battery 460.

The radio communication unit 410 functions to perform radio communication with the radio base station BS or the radio relay station RS. Specifically, the radio communication unit 410 includes a transmitter 411 which transmits a radio signal, and a receiver 412 which receives a radio signal. The transmitter 411 includes a power amplifier, an up converter, and the like. The receiver 412 includes a LNA (Low Noise Amplifier), a down converter, and the like. Note that, the receiver 412 functions to measure the reception quality of the received radio signal. The GPS receiver 420 receives a signal from a global positioning system (GPS) satellite.

The controller 430 is formed of a CPU, for example, and controls various functions included in the radio terminal 400. The storage 440 is formed of a memory, for example, and stores therein various information used for control and the like in the radio terminal 400.

The user interface unit 450 includes: a microphone for collecting sound; a speaker for outputting sound; a display for displaying images and the like; a numeric/function keypad for inputting the contents of operation by the user; and the like. The battery 460 stores power, and supplies the stored power to the functional blocks constituting the radio terminal 400.

The controller 430 includes a deterioration detector 431, a location detector 432, a search processing unit 433, and a handover execution unit 434.

The deterioration detector 431 detects that the reception quality, in radio communication, received from the radio base station BS or the radio relay station RS is deteriorated (that the RSSI falls below a predetermined threshold, for example).

The location detector 432 detects a current location of the radio terminal 400 on the basis of a satellite signal received by the GPS receiver 420. Terminal location information indicating the location detected by the location detector 432 is transmitted to the radio base station BS or the radio relay station RS through the transmitter 411.

The search processing unit 433 executes the search processing described above. To be more specific, the search processing unit 433 measures the reception quality of each radio signal transmitted by the radio base station BS and the radio relay station RS which can be candidates for a radio communication counterpart of the radio terminal 400, by using the receiver 412 on the basis of the neighbor list notified by the radio base station BS. Then, the search processing unit 433 selects either the radio base station BS or the radio relay station RS having the best reception quality as the radio communication counterpart.

In the second embodiment, the search processing unit 433 executes the search processing not on all the radio base station BS and the radio relay station RS included in the neighbor list, but only on a top predetermined number (more specifically, the top two) of the stations in the ascending order of a distance to the radio terminal 400.

The handover execution unit 434 executes handover in accordance with a result of the search processing by the search processing unit 433. In other words, the handover execution unit 434 executes handover to a new radio communication counterpart with the radio base station BS or the radio relay station RS having the best reception quality set as the new radio communication counterpart.

(2.2) Configuration of Location Management Device

Figure 10:
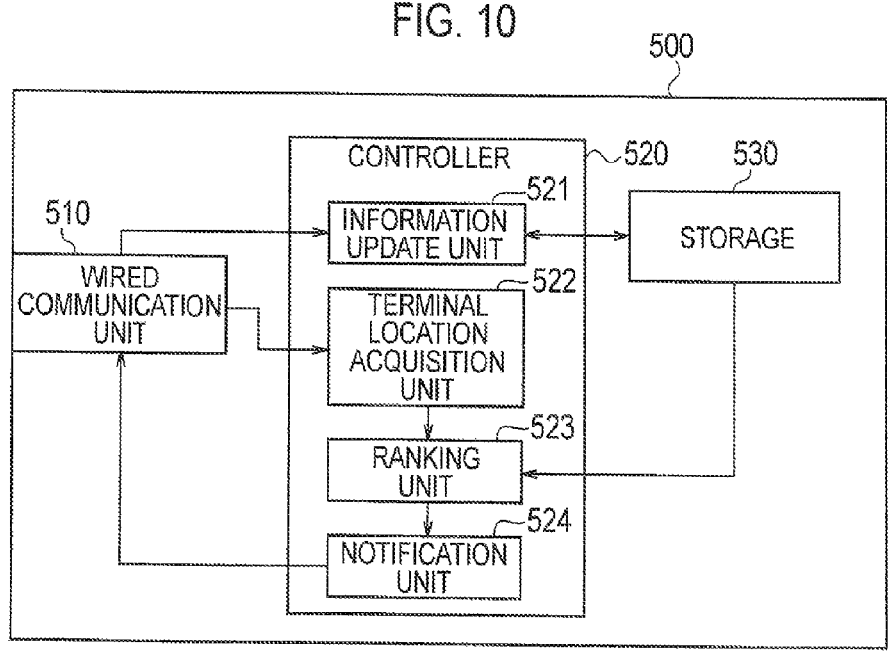
FIG. 10 is a functional block diagram showing a configuration of a location management device according to the second embodiment of the present invention.

FIG. 10 is a functional block diagram showing a configuration of the location management device 500. As shown in FIG. 10, the location management device 500 includes a wired communication unit 510, a controller 520, and a storage 530.

The wired communication unit 510 is wired to the gateway device GW, and communicates with the radio base station BS through the gateway device GW. The controller 520 is formed of a CPU, for example, and controls various functions included in the location management device 500. The storage 530 is formed of a memory, for example, and stores therein various information used for control and the like in the location management device 500.

The storage 530 stores therein station location information indicating locations of the radio base station BS and the radio relay station RS. The station location information is formed by associating an identifier (ID) for identifying the radio base station BS or the radio relay station RS with the location of the corresponding one of the radio base station BS and the radio relay station RS (see FIG. 14). In the example of FIG. 14, locations of the radio base station BS, the radio relay station RS1, the radio relay station RS2, and the radio relay station RS3 are respectively registered.

The station location information of the radio base station BS may be stored in the storage 530 at the time of the installation of the radio base station BS. If the radio relay station RS is of a fixed type, the station location information of the radio relay station RS may be stored in the storage 530 at the time of the installation of the radio relay station RS. If the radio relay station RS is movable, the station location information of the radio relay station RS is updated as needed. Hereinbelow, description is given of a case where the radio relay station RS is movable and the station location information of the radio relay station RS is updated as needed.

The controller 520 includes an information update unit 521, a terminal location acquisition unit 522, a ranking unit 523, and a notification unit 524.

Once the wired communication unit 510 receives a location notice for notification of a current location of the radio relay station RS, the information update unit 521 updates station location information stored in the storage 530 in accordance with the location notice.

Once the wired communication unit 510 receives terminal location information transmitted by the radio terminal 400, the terminal location acquisition unit 522 acquires the terminal location information and transmits the acquired terminal location information to the ranking unit 523.

The ranking unit 523 ranks the radio base station BS and the radio relay station RS in the ascending order of a distance to the radio terminal 400, on the basis of the station location information stored in the storage 530 and the terminal location information acquired by the terminal location acquisition unit 522.

Through the wired communication unit 510, the notification unit 524 transmits a ranking notice based on a result of the ranking by the ranking unit 523. The ranking notice is transmitted to the radio terminal 400 through the radio base station BS.

The ranking notice is information formed by associating an identifier (ID) for identifying the radio base station BS or the radio relay station RS with the rank of the corresponding one of the radio base station BS and the radio relay station RS (see FIG. 15). In the example of FIG. 15, ranks are given to the radio base station BS, the radio relay station RS1, the radio relay station RS2, and the radio relay station RS3 in the ascending order of the distance to the radio terminal 400.

(2.3) Configuration of Radio Relay Station

Figure 11:
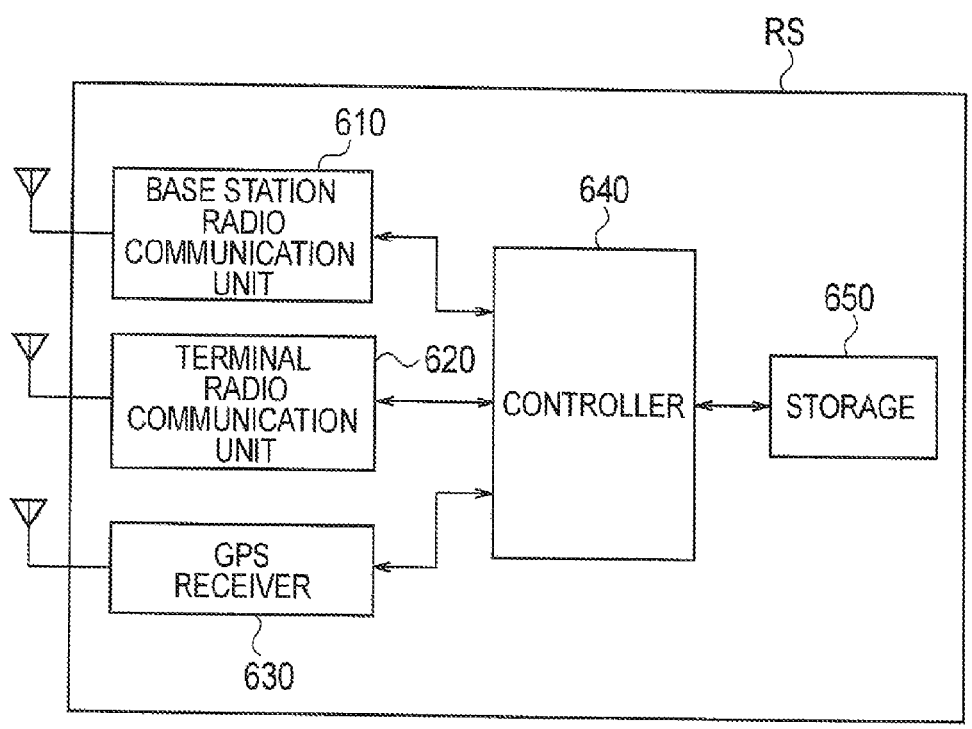
FIG. 11 is a functional block diagram showing a configuration of a radio relay station according to the second embodiment of the present invention.

FIG. 11 is a functional block diagram showing a configuration of the radio relay station RS according to the second embodiment. As shown in FIG. 11, the radio relay station RS includes a base station radio communication unit 610, a terminal radio communication unit 620, a GPS receiver 630, a controller 640, and a storage 650.

The base station radio communication unit 610 functions to perform radio communication with the radio base station BS. The terminal radio communication unit 620 functions to perform radio communication with the radio terminal 400. The GPS receiver 630 receives a signal from a GPS satellite.

The controller 640 is formed of a CPU, for example, and controls various functions included in the radio relay station RS. The controller 640 periodically detects the location of the station itself with the GPS receiver 630, and periodically sends the radio base station BS station location information, which indicates the detected location, through the base station radio communication unit 610. The storage 650 is formed of a memory, for example, and stores therein various information used for control and the like in the radio relay station RS.

(3) Operation of Radio Communication System

Next, an operation of the radio communication system 10 is described with reference to FIG. 12 to FIG. 15. Specifically, description is given of (3.1) Relay Station Location Registration Operation and (3.2) Handover Operation.

Here, the relay station location registration operation is an operation of the radio communication system 10 performed when the location management device 500 registers the location of the radio relay station RS. The handover operation is an operation of the radio communication system 10 performed when the radio terminal 400 executes handover.

(3.1) Relay Station Location Registration Operation

Figure 12:
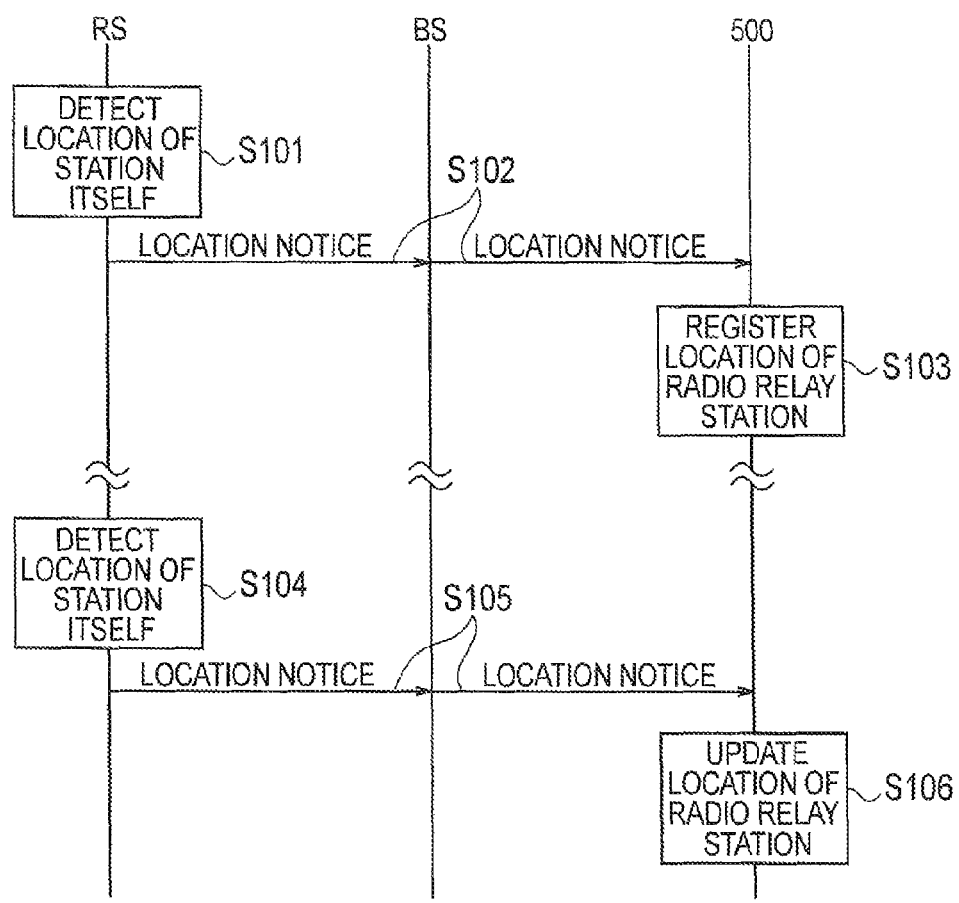
FIG. 12 is a sequence diagram showing a flow of a relay station location registration operation according to the second embodiment of the present invention.

FIG. 12 is a sequence diagram showing a flow of the relay station location registration operation.

In Steps S101 and S102, the controller 640 of the radio relay station RS detects the location of the station itself with the GPS receiver 630, and sends the radio base station BS station location information, which indicates the detected location, through the base station radio communication unit 610. Upon receipt of the station location information from the radio relay station RS, the radio base station BS sends the location management device 500 the station location information thus received.

The wired communication unit 510 of the location management device 500 sends the information update unit 521 the station location information received from the radio base station BS. In Step S103, the information update unit 521 of the location management device 500 stores the station location information in the storage 530 to register the location of the radio relay station RS.

In Steps S104 and S105, the controller 640 of the radio relay station RS sends the radio base station BS station location information of the station itself through the base station radio communication unit 610 in the same manner as Step S101. Upon receipt of the station location information from the radio relay station RS, the radio base station BS sends the location management device 500 the station location information thus received.

The wired communication unit 510 of the location management device 500 sends the information update unit 521 the station location information received from the radio base station BS. In Step S106, the information update unit 521 stores the station location information of the radio relay station RS in the storage 530 again to update the station location information of the radio relay station RS. Thereby, the station location information of the radio relay station RS is kept up-to-date.

(3.2) Handover Operation

Figure 13:
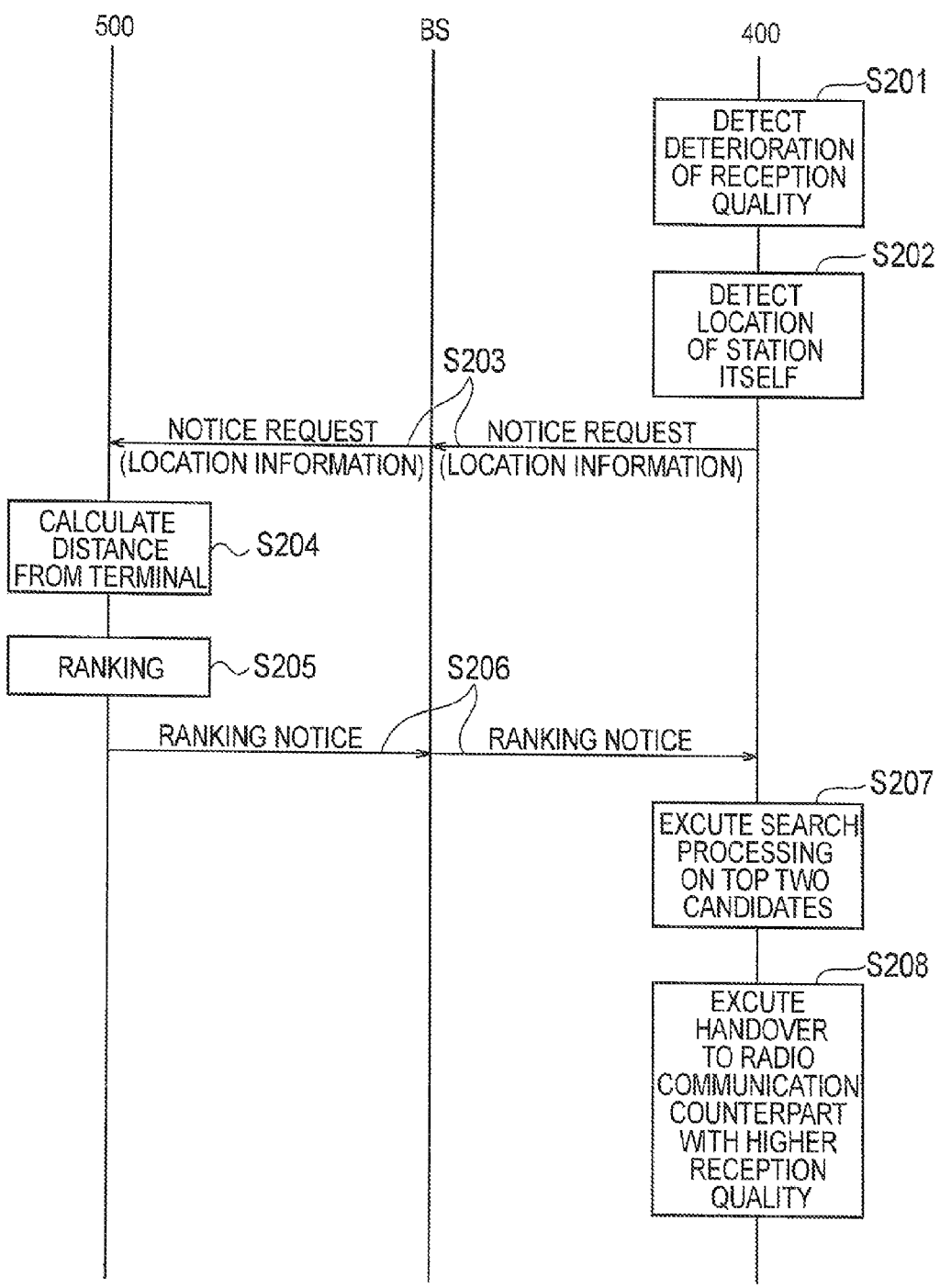
FIG. 13 is a sequence diagram showing a flow of a handover operation according to the second embodiment of the present invention.

FIG. 13 is a sequence diagram showing a flow of the handover operation. Description is given here of a case where the radio terminal 400 executes handover of switching its radio communication counterpart from the radio base station BS to the radio relay station RS.

In Step S201, the deterioration detector 431 of the radio terminal 400 detects that the reception quality of the radio signal transmitted by the radio base station BS is deteriorated. Once the deterioration detector 431 detects the deterioration of the reception quality, the location detector 432 of the radio terminal 400 detects the location of the radio terminal 400 with the GPS receiver 420 in Step S202. Once the location detector 432 detects the location of the radio terminal 400, the transmitter 411 of the radio terminal 400 sends the radio base station BS terminal location information indicating the detected location (Step S203). Upon receipt of the terminal location information from the radio terminal 400, the radio base station BS sends the location management device 500 the terminal location information thus received (Step S203).

Note that, the following method may be employed instead of causing the location detector 432 to detect the location after the deterioration detector 431 detects the deterioration of the reception quality. Specifically, the location detector 432 may periodically detect the location of the radio terminal 400, and the transmitter 411 may transmit the latest terminal location information to the radio base station BS once the deterioration detector 431 detects the deterioration of the reception quality.

The terminal location acquisition unit 522 of the location management device 500 acquires the terminal location information through the wired communication unit 10, and transmits the acquired terminal location information to the ranking unit 523. Upon transmission of the terminal location information, the ranking unit 523 reads station location information stored in the storage 530. In Step S204, the ranking unit 523 calculates a distance between the radio terminal 400 and the radio base station BS as well as a distance between the radio terminal 400 and the radio relay station RS on the basis of the terminal location information and the station location information.

In the example of FIG. 8, the ranking unit 523 calculates a distance d1 between the radio terminal 400 and the radio base station BS, a distance d2 between the radio terminal 400 and the radio relay station RS1, a distance d3 between the radio terminal 400 and the radio relay station RS2, and a distance d4 between the radio terminal 400 and the radio relay station RS3. Note that, since the radio terminal 400 executes handover from the radio base station BS in this operation example, the calculation of the distance d1 may be omitted.

In Step S205, the ranking unit 523 ranks the radio base station BS and the radio relay station RS in the ascending order of the distances d1 to d4 calculated in Step S204. In the example of FIG. 8, the distance d3 between the radio terminal 400 and the radio relay station RS2 is the smallest, meaning that the radio relay station RS2 is the closest to the radio terminal 400. A result of the ranking is the distance d3<the distance d4<the distance d1<the distance d2 (i.e., the radio relay station RS2<the radio relay station RS3<the radio base station BS<the radio relay station RS1).

In Step S205, the notification unit 524 of the location management device 500 sends the radio base station BS a ranking notice (see FIG. 15) indicating the result of the ranking made by the ranking unit 523, through the wired communication unit 510. In other words, in the second embodiment, the notification unit 524 and the wired communication unit 510 each constitute a notice transmitter transmitting the ranking notice. The radio base station BS sends the radio terminal 400 the ranking notice received from the location management device 500.

Upon receipt of the ranking notice from the radio base station BS, the receiver 412 of the radio terminal 400 transmits the received ranking notice to the search processing unit 433. In the second embodiment, the receiver 412 constitutes a notice receiver receiving the ranking notice.

In Step S205, the search processing unit 433 executes search processing only on the smallest two of the radio base station BS, the radio relay station RS1, the radio relay station RS2, and the radio relay station RS3 in terms of the distance to the radio terminal 400, more specifically, only on the radio relay station RS2 and the radio relay station RS3. As a result, search processing on the radio base station BS and the radio relay station RS1 is omitted.

The search processing unit 433 receives radio signals respectively transmitted by the radio relay station RS2 and the radio relay station RS3, and measures the reception quality of each radio signal. Then, the search processing unit 433 compares the measured reception quality to specify the radio relay station with higher reception quality.

Assume here that the reception quality from the radio relay station RS2 is higher than the reception quality from the radio relay station RS3. A result of the search processing executed by the search processing unit 433 is transmitted to the handover execution unit 434.

In Step S208, the handover execution unit 434 executes handover with the radio relay station RS2 set as a handover destination, in accordance with the result of the search processing executed by the search processing unit 433.

(4) Advantageous Effects

As has been described, the location management device 500 sends the radio terminal 400 the ranking notice based on the result of ranking the radio base station BS and the radio relay station RS in the ascending order of the distance to the radio terminal 400. On the basis of the ranking notice received from the location management device 500, the radio terminal 400 executes the search processing only on a top predetermined number (the smallest two in the second embodiment) of the radio base station BS and the radio relay station RS, which can be candidates for the radio communication counterpart, in the ascending order of the distance to the radio terminal 400.

In other words, the radio terminal 400 executes the search processing not on all the radio base station BS and the radio relay station RS, which can be candidates for the radio communication counterpart, but only on a part thereof. This allows reduction in the processing load and power consumption associated with the search processing.

Further, the radio base station BS or the radio relay station RS having a small distance to the radio terminal 400 is considered as an appropriate radio communication counterpart of the radio terminal 400 since it has a small propagation loss in radio communication with the radio terminal 400. Accordingly, the radio terminal 400 can select its appropriate radio communication counterpart by executing the search processing only on the top predetermined number of the stations in the ascending order of the distance to the terminal itself.

Thus, the radio communication system 10 according to the second embodiment allows the radio terminal 400 to select its appropriate radio communication counterpart while reducing the processing load and power consumption of the radio terminal 400 that are associated with the search processing, in the case where the radio base station BS and the radio relay station RS can be candidates for the radio communication counterpart of the radio terminal 400.

In particular, since the power stored in the battery 460 of the radio terminal 400 is limited, the reduction in the power consumption of the radio terminal 400 allows extension of a time period during which the radio terminal 400 is operable.

In the second embodiment, the radio relay station RS is movable, and periodically sends the location management device 500 the location notice for notification of the location of the radio relay station RS. Upon receipt of the location notice, the information update unit 521 of the location management device 500 updates the station location information stored in the storage 530 in accordance with the location notice. Thereby, the station location information of the radio relay station RS is always kept up-to-date. Consequently, the radio terminal 400 can select its appropriate radio communication counterpart more reliably.

In the second embodiment, the radio terminal 400 detects the location of the radio terminal 400 with the GPS receiver 420, and sends the location management device 500 the terminal location information indicating the detected location. This allows the radio terminal 400 to detect the location of the radio terminal 400 with high accuracy and thus to select its appropriate radio communication counterpart more reliably.

In the second embodiment, the radio terminal 400 includes the handover execution unit 434 which executes handover to the radio communication counterpart selected through the search processing. Since the appropriate radio communication counterpart is selected in the second embodiment as described above, the radio terminal 400 can execute handover to its appropriate radio communication counterpart, and thus can keep high-quality communication even after the handover.

Other Embodiments

As described above, the details of the present invention have been disclosed by using the embodiments of the present invention. However, it should not be understood that the description and drawings which constitute part of this disclosure limit the present invention. From this disclosure, various alternative embodiments, examples, and operation techniques will be easily found by those skilled in the art.

In the first embodiment, the radio relay station 100 relays data between the radio base station 200 and the radio terminal 300. However, in a case where two radio terminals 300 communicate with each other by using the TDD scheme, the radio relay station 100 may relay data transmitted and received between these radio terminals 300. Moreover, in a case where multiple radio relay stations 100 each relay data between the radio base station 200 and the radio terminal 300, one of the radio relay stations 100 may relay data transmitted and received between the other radio relay stations 100.

Note that, although the radio communication system 1 based on WiMAX (IEEE802.16) is described in the first embodiment, the radio communication system may be based on any standard other than WiMAX as long as the system employs the TDD scheme. For example, the present invention is also applicable to the next generation PHS system, the iBurst (registered trademark) system, and the like.

Further, the radio relay station 100 is not limited to be of a fixed type, but may be of a movable type mounted on a vehicle, for example.

In the second embodiment, the location management device 500 is provided on the network side separately from the radio base station BS. However, the location management device 500 may be provided in the radio base station BS. Alternatively, the location management device 500 may be provided in the gateway device GW.

In the second embodiment, the radio terminal 400 executes the search processing only on the smallest two in terms of the distance to the radio terminal 400. However, the radio terminal 400 may execute the search processing only on the smallest one in terms of the distance to the radio terminal 400 (the closest station) instead of on the smallest two. Alternatively, the radio terminal 400 may execute the search processing only on the smallest three, for example, instead of on the smallest two.

Further, in the second embodiment, description is given of the case where the radio relay station RS is movable. However, the radio relay station RS may be of a fixed type.

In the second embodiment, the GPS is used for location detection. However, an existing location detection technique (such as a triangulation method) may be employed instead of the GPS.

Further, in the second embodiment, the location management device 500 ranks the radio base station BS and the radio relay station RS in the ascending order of the distance to the radio terminal 400. However, the present invention is not limited to this, and the location management device 500 may rank the radio base station BS and the radio relay station RS in the descending order of the distance to the radio terminal 400.

In the second embodiment, the location management device 500 manages the station location information. However, the location management device 500 may manage other information in addition to the station location information. For example, the location management device 500 may also manage operation state information indicating the operation state of the radio relay station RS. To be more specific, since the state of the radio relay station RS is frequently switched between operation/non-operation (power on/off), it is preferable that a radio base station RS having a small distance to the radio terminal 400 be not notified if the radio base station RS is not in operation. For this reason, the location management device 500 stores the operation state information indicating operation/non-operation in the storage 530, and, performs ranking with the non-operating radio relay station RS excluded at the time of the ranking.

In the second embodiment, the handover on the initiative of the radio terminal 400 is described. However, the handover may be performed on the initiative of the radio base station BS. For example, the radio base station BS may direct the radio terminal 400 to execute handover, and the radio terminal 400 may start the handover procedure in accordance with this direction.

Further, in the second embodiment, the search processing executed at the time of the handover is mainly described. However, the present invention is not limited to such search processing, but is also applicable to initial search processing executed upon power-on and the like of the radio terminal 400, for example.

Figure 16:
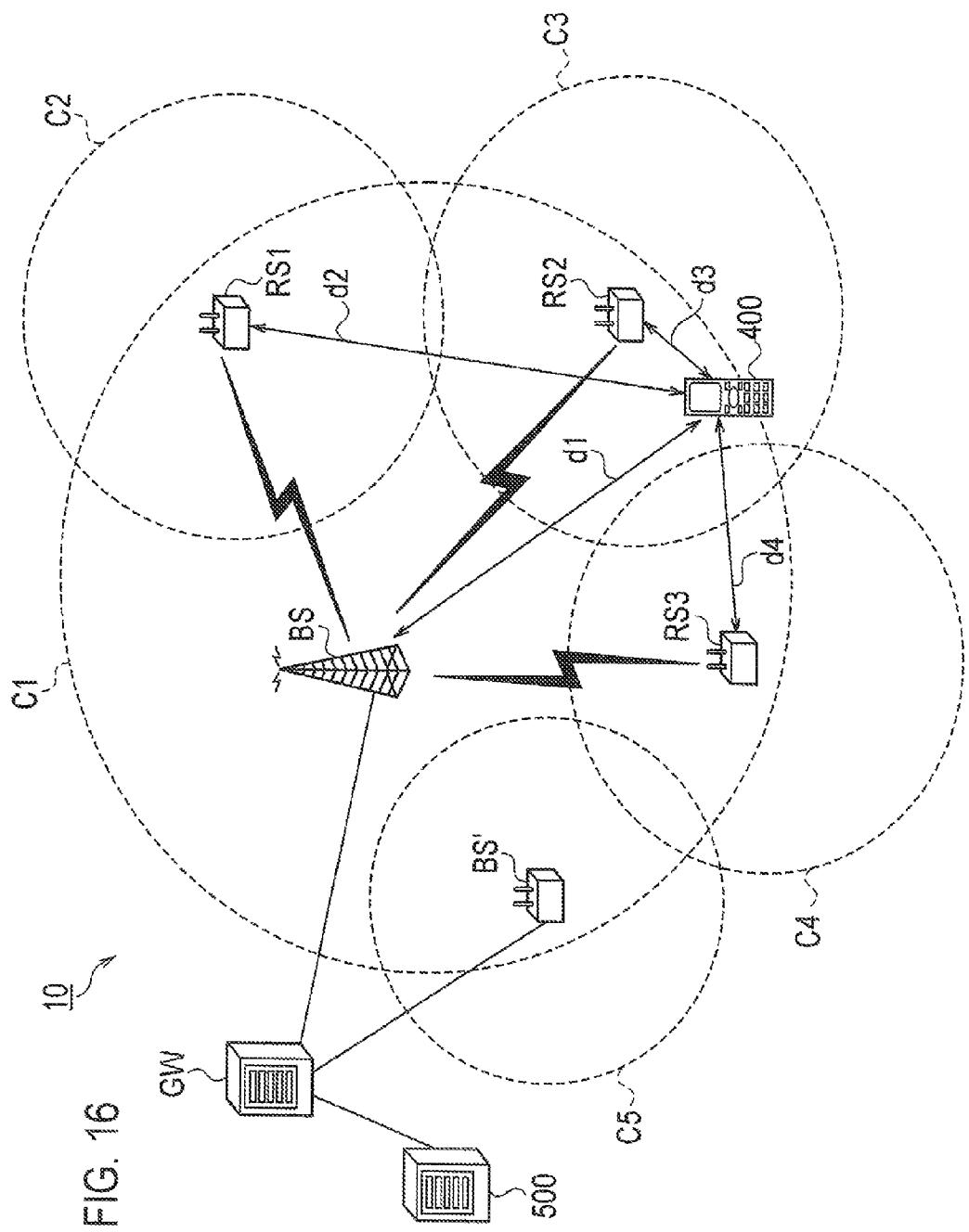
FIG. 16 is a view showing a schematic configuration of a radio communication system according to other embodiments of the present invention.

In the second embodiment, the radio base station BS forming the relatively large cell C1 is described. However, the radio base station is not limited to such a radio base station BS, but a radio base station BS' forming a small cell C5 (so-called a femtocell base station) may also be included in the radio communication system 10, as shown in FIG. 16. In this case, the location management device 500 also manages the location of the radio base station BS' in addition to those of the radio base station BS, the radio relay station RS1, the radio relay station RS2, and the radio relay station RS3.

As described above, the present invention naturally includes various embodiments which are not described herein. Accordingly, the technical scope of the present invention should be determined only by the matters to define the invention in the scope of claims regarded as appropriate based on the description.

Note that the entire contents of Japanese Patent Application No. 2008-217661 (filed on Aug. 27, 2008) and Japanese Patent Application No. 2008-247122 (filed on Sep. 26, 2008) are incorporated herein by reference.

INDUSTRIAL APPLICABILITY

As has been described, the radio relay station and the radio relay method according to the present invention can prevent the first transceiver and the second transceiver from being affected by their mutual interference without changing a communication frequency, and suppress increase in size and cost. Thus, the radio relay station and the radio relay method are advantageous in radio communication such as mobile communication.

Further, the radio communication system, the location management device, the radio terminal, and the radio communication method according to the present invention allow the radio terminal to select its appropriate radio communication counterpart while reducing the processing load and power consumption of the radio terminal that are associated with search processing, in the case where the radio base station and the radio relay station can be candidates for the radio communication counterpart of the radio terminal. Thus, the radio communication system, the location management device, the radio terminal, and the radio communication method are advantageous in radio communication such as mobile communication.

The invention claimed is:

1. A radio relay station configured to relay data between a first radio communication device and a second radio communication device, wherein the data is communicated using communication time frames segmented on a time axis, wherein each communication time frame comprises a first period and a second period, and wherein the radio relay station comprises:
   a first transceiver configured to receive data from the first radio communication device in a first period of a first communication time frame and to transmit data to the first radio communication device in a second period of the first communication time frame, wherein a time length of the first period is longer than a time length of the second period;
   a second transceiver configured to transmit data to the second radio communication device and to receive data from the second radio communication device; and
   a controller configured to control the second transceiver, wherein the controller sets a transmission period that comprises the second period of the first communication time frame and a first portion of a first period of a second communication time frame that is subsequent to the first communication time frame,
   wherein, during the transmission period, the second transceiver transmits data to the second radio communication device in the second period of the first communication time frame, and
   wherein the controller prevents transmission of data from the second transceiver to the second radio communication device during the first portion of the first period of the second communication time frame.

2. The radio relay station according to claim 1, wherein the controller sets a reception period that comprises a second portion of the first period of the second communication time frame, and wherein, during the reception period, the second transceiver receives data from the second radio communication device.

3. The radio relay station according to claim 1, wherein a frequency band available for radio communication by the first transceiver and the second transceiver is divided into at least three communication frequencies,
   the three communication frequencies include a first communication frequency, a second communication frequency, and a third communication frequency between the first communication frequency and the second communication frequency, the first transceiver performs radio communication with the first radio communication device by not using the third communication frequency but using the first communication frequency, and the second transceiver performs radio communication with the second radio communication device by not using the third communication frequency but using the second communication frequency.

4. The radio relay station according to claim 1, wherein the first radio communication device is a radio base station, and the second radio communication device is a radio terminal.

5. A radio relay method used for a radio relay station configured to relay data between a first radio communication device and a second radio communication device, wherein the data is communicated using communication time frames segmented on a time axis, and wherein each communication time frame comprises a first period and a second period, the radio relay method comprising:

causing a first transceiver to receive data from the first radio communication device in a first period of a first communication time frame and to transmit data to the first radio communication device in a second period of the first communication time frame, wherein a time length of the first period is longer than a time length of the second period; and controlling a second transceiver configured to transmit data to the second radio communication device and to receive data from the second radio communication device, wherein the controlling comprises setting a transmission period that comprises the second period of the first communication time frame and a first portion of a first period of a second communication time frame that is subsequent to the first communication time frame, during the transmission period, causing the second transceiver to transmit data to the second radio communication device in the second period of the first communication time frame, and preventing transmission of data from the second transceiver to the second radio communication device during the first portion of the first period of the second communication time frame.

* * * * *